May 17, 1949.   T. I. LESTON ET AL   2,470,707
WELDING ROD MARKING MACHINE
Filed July 2, 1947   4 Sheets-Sheet 1
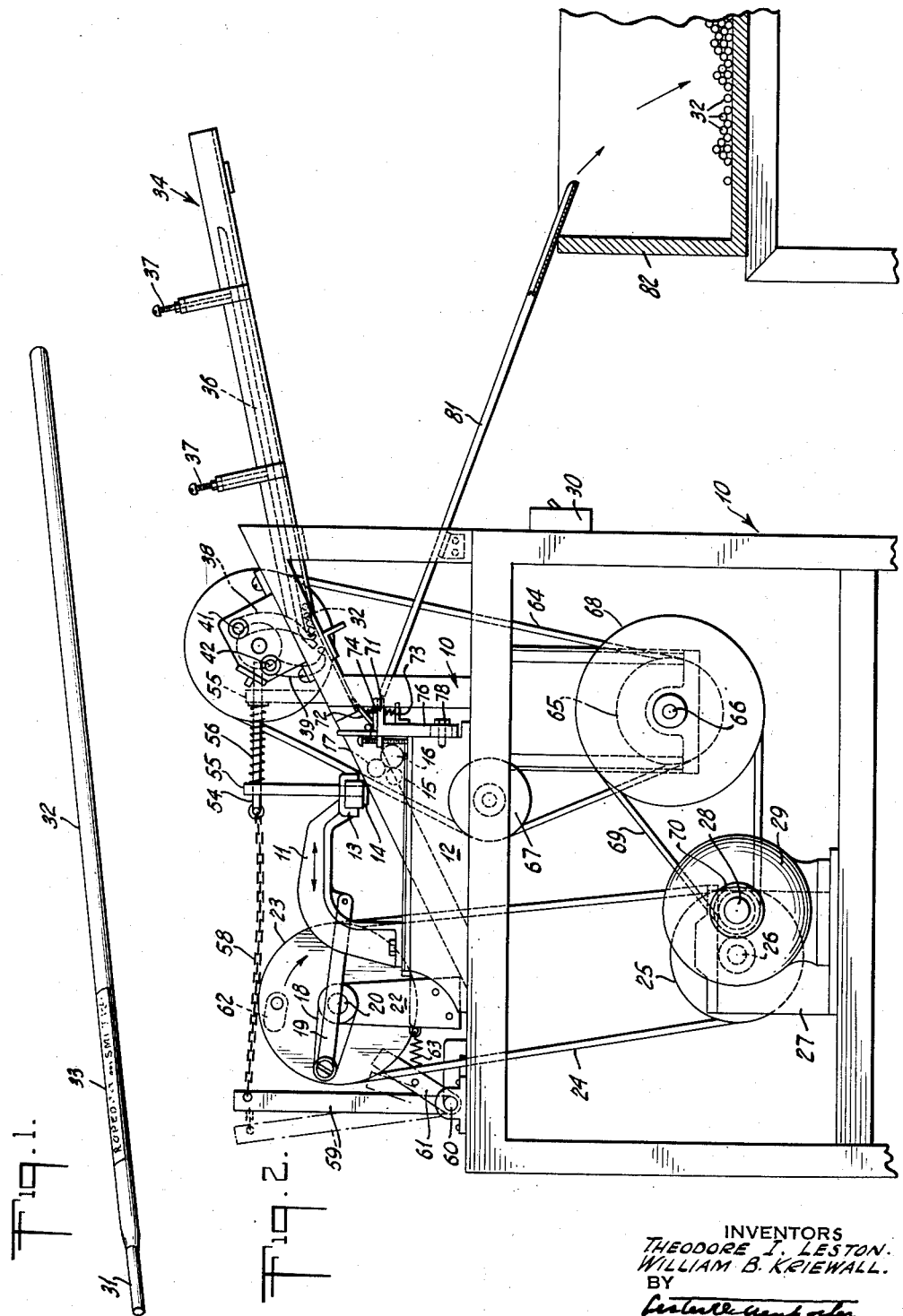
INVENTORS
THEODORE I. LESTON.
WILLIAM B. KRIEWALL.
BY
ATTORNEY May 17, 1949.　　　　T. I. LESTON ET AL　　　　2,470,707
WELDING ROD MARKING MACHINE
Filed July 2, 1947　　　　　　　　　　　　4 Sheets-Sheet 2
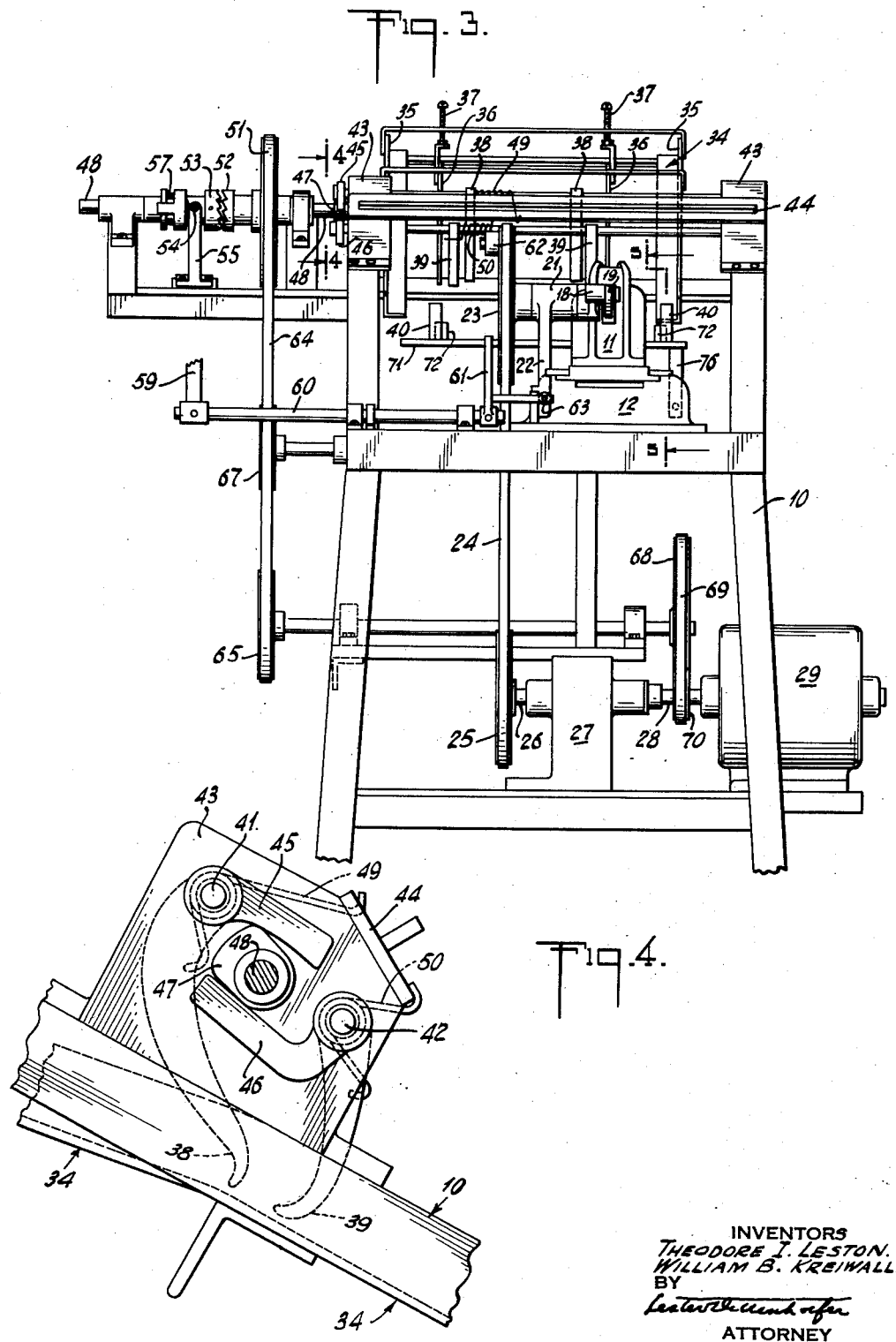
INVENTORS
THEODORE I. LESTON.
WILLIAM B. KREIWALL.
BY
ATTORNEY

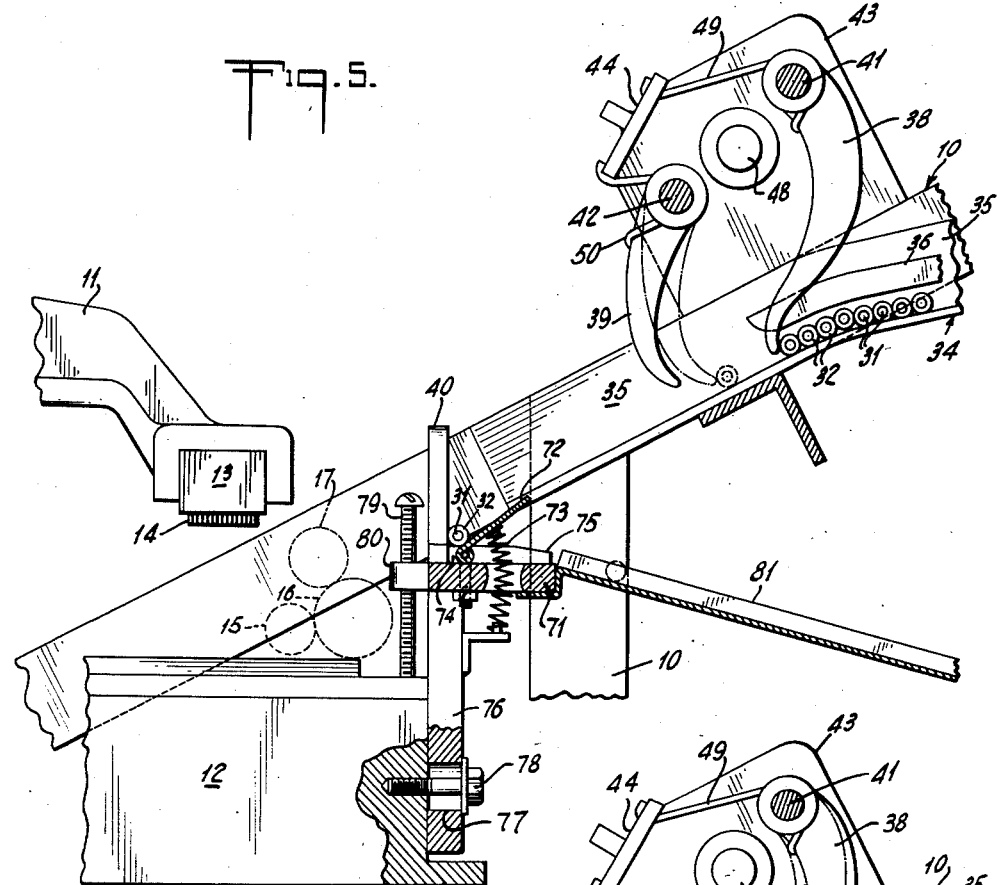

May 17, 1949. T. I. LESTON ET AL 2,470,707
WELDING ROD MARKING MACHINE
Filed July 2, 1947 4 Sheets-Sheet 4
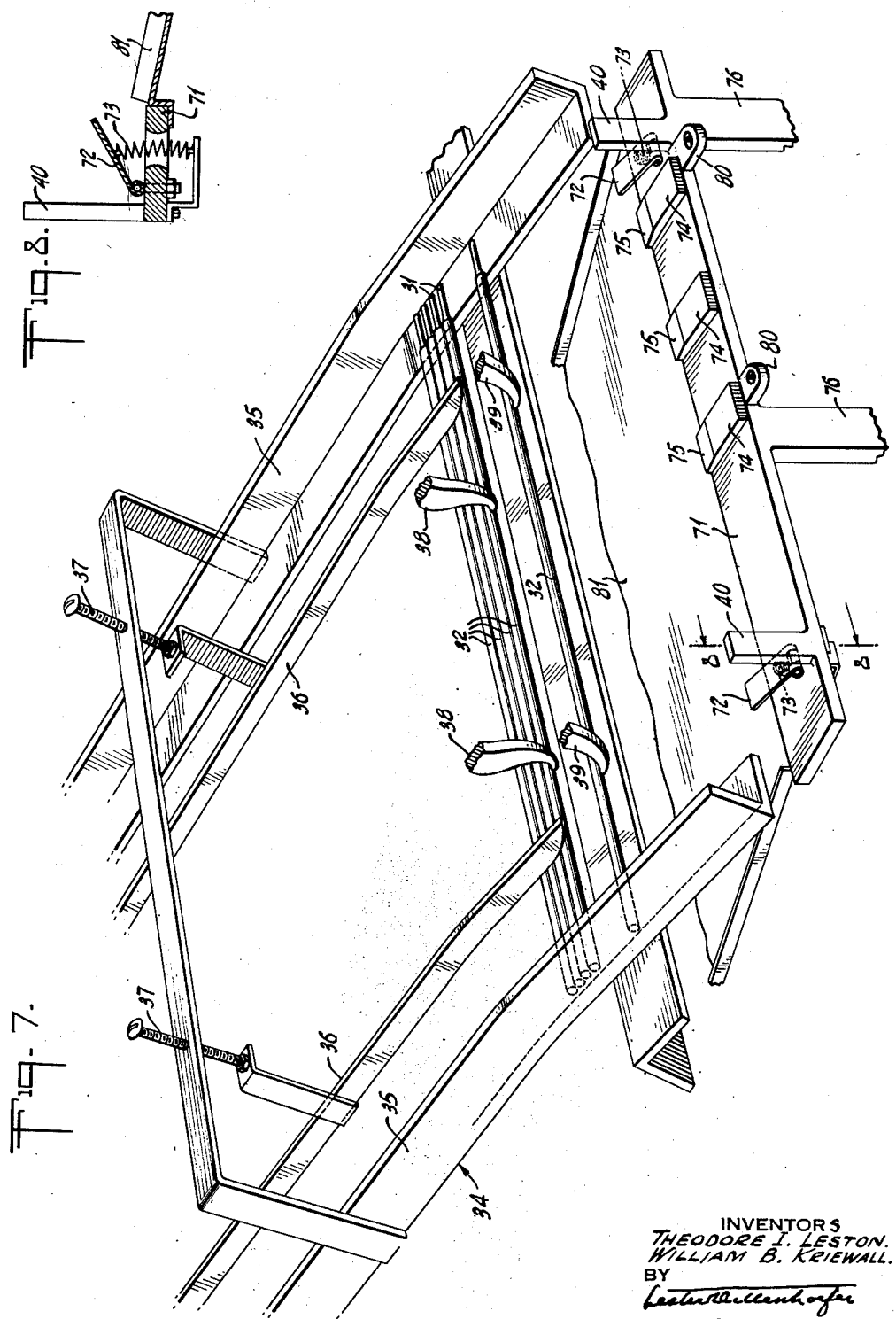
INVENTORS
THEODORE I. LESTON.
WILLIAM B. KRIEWALL.
BY
ATTORNEY Patented May 17, 1949

2,470,707

UNITED STATES PATENT OFFICE 2,470,707

WELDING ROD MARKING MACHINE

Theodore I. Leston and William B. Kriewall, New York, N. Y., assignors to Eutectic Welding Alloys Corporation, New York, N. Y., a corporation of New York Application July 2, 1947, Serial No. 758,572

4 Claims. (Cl. 101—44)

This invention relates to a welding rod marking machine, and more particularly to a machine for marking electric welding rods consisting of a relatively long cylindrical metal rod coated with a welding flux, of the type known as eutectic welding rods.

The principal objects of the invention are to provide a machine for feeding such cylindrical welding rods, and printing suitable indicia on the coated surface thereof, such for example as the name or trade-mark of the producer, the current and amperage at which the rod is intended to be used, the stock number, as well as other markings.

As will appear from the following description, the machine is designed to achieve these results efficiently, rapidly, and economically without involving any manual labor in the feeding, printing, and delivering operations.

A preferred embodiment of the machine is illustrated in the accompanying drawings, in which:

Figure 1 is a perspective view of a welding rod of the type with which the machine is designed to operate;

Fig. 2 is a view in side elevation, partly in section, of a machine for marking such rods;

Fig. 3 is a view in front elevation of the machine;

Fig. 4 is a sectional view, on an enlarged scale, taken on the line 4—4 of Fig. 3;

Fig. 5 is a sectional view on the line 5—5 of Fig. 3 showing parts of the machine in one position;

Fig. 6 is a similar view showing the same parts in another position;

Fig. 7 is a view in perspective, with parts broken away, of the cylindrical rod feeding device; and, Fig. 8 is a detail sectional view on the line 8—8 of Fig. 7.

Referring to the drawings, 10 represents the frame upon which the operating parts of the machine are supported. These parts comprise a printing device, a rod feeding device, and a delivering device, and they will be described in that order.

The printing device comprises a printing head 11 which is slidably mounted for horizontal reciprocating motion on a base 12 supported on the frame. At the front end of the head is a type-holder 13 in which the printing-plate 14 is held. The printing-plate is preferably made of rubber or the like. Ink is applied to the type, by the distributor rolls 15, 16 and 17, as the printing-plate is reciprocated over the contacting surface of the upper roll 17. Reciprocating motion of the printing head is effected by the crank arm 18 and link 19 operated by a shaft 20 supported in a bearing 21 mounted on a pedestal 22. The shaft 20 is secured to a pulley 23 by hich it is rotated, said pulley being connected by a belt 24 with a driving pulley 25. The latter pulley is fixed to a shaft 26 that is driven by reduction gears (not shown) housed in a reduction gear box 27. The gears are driven, through a shaft 28, by an electric motor 29 or other suitable driver. The motor operates all of the moving or driven parts of the machine, and its operation is controlled by a suitable electric switch 30.

The rod feeding device is designed to release one rod at a time and to feed it by gravity into position to be marked by the printing device, operation of said devices being properly synchronized to effect the desired result. An example of the article or electrode to be marked or printed is illustrated in Fig. 1. This consists of a cylindrical metal rod 31 coated or covered with a welding flux 32 on which the marking or printing 33 is applied. For convenience, the rods as a whole will hereafter be indicated by the reference numeral 31.

The feeding device includes a magazine or hopper 34 in which a reserve supply of the welding rods 31 is kept. The magazine comprises two inclined angle-irons 35 supported in substantially parallel relation and spaced apart a distance approximately equal to the length of a rod, as best seen in Fig. 7. The ends of the cylindrical rods are supported to roll on the angle-beams. Guidebars 36 are disposed in the magazine between the angle-irons to prevent the rods from riding or mounting one on the other as they are being fed by gravity. The bars may be adjusted for height, by means of the adjusting screws 37, to accommodate rods of different diameters.

Release of the rods, one at a time, is controlled by two sets of fingers 38 and 39 that operate in timed relationship to each other and to the movements of the printing head. The manner of operation of these fingers is shown in Figs. 5 and 6. In Fig. 5 the arm 39 is shown in open position in solid lines and in closed position by dotted lines, while in Fig. 6 the two positions of the arm 38 are similarly shown by solid and dotted lines. The fingers 38 are raised from closed to open position to release one of the rods 31 from the supply and permit it to roll down against the fingers 39 which are then in their closed position as shown in Fig. 6. On opening the fingers 39 the rod will roll down against the stops 40 in position to be printed. It will be seen that the fingers 39 provide a rack in which one rod is always held ready to be released into printing position. The fingers move through a relatively small angle and are quick-acting so as to assure of feeding only one rod at a time.

The fingers 38 and 39 are fixed, respectively, to the rock-shafts 41 and 42 which shafts are borne at their ends in blocks 43, one at each side of the frame. A cross-piece 44 extends between the two blocks. On referring to Fig. 4 it will be seen that the left-hand end of each of the rock-shafts is provided with an arm 45 and 46, respectively, that ride on a cam 47 which is fixed to the shaft 48. As the cam rotates the fingers 38 and 39 are successively raised to open position. Springs 49 and 50 are provided to return the fingers to closed position. The springs are coiled about the rock-shafts 41 and 42, respectively, each having one leg caught on the cross-piece 44 and the other leg bearing against the respective fingers.

Mounted to rotate freely on the shaft 48 is a driving pulley 51 having a sleeve portion that carries the free clutch member 52. Splined to said shaft is a slidable clutch member 53. Said slidable clutch member is normally held disengaged by a pin or detent 54 supported to slide lengthwise in supporting arms 55. A spring 56 normally urges the pin into its holding position. When the pin is retracted, the clutch member 53 will be pressed by the springs 57 into engagement with its companion clutch member 52 and thus cause the shaft 48, and its attached cam, to rotate temporarily so as to actuate the fingers 38 and 39.

The pin 54, as seen in Fig. 2, is connected by a chain 58 or the like to a lever arm 59 fixed to the outer end of a horizontal shaft 60. Fixed to the other end of the shaft, but set at an angle to the arm 59, is a second arm 61. The pulley 23, which actuates movement of the printing head as heretofore described, carries a boss 62 on one surface in position to engage and to trip the arm 61 once during each revolution of the pulley. A spring 63 causes the arm 61 to return to its original position after being tripped. It will be apparent that whenever the arm is tripped, the pin 54 will be retracted and the clutch members will become engaged with each other. Tripping of the arm 61, and the consequent operation of the fingers 38 and 39, are synchronized with the reciprocating movement of the printing head so as to release and feed a rod 31 into printing position as the head moves about 15° on its back stroke, and thus be ready to be printed as the head again moves forward.

The pulley 51 is connected by a belt 64 to a pulley 65 fixed to the shaft 66, which belt passes over an idler or tension roll 67. The shaft 66 is rotated by a pulley 68 connected by a belt 69 to the pulley 70 fixed to the motor driven shaft 28.

Attached to the frame, adjacent the feeding device, is a vertically adjustable bracket 71 as seen in Figs. 5, 6, and 7. Mounted on the bracket, adjacent its ends, are two hinged plates 72 that are each normally held in inclined position, as seen in Figs. 5 and 8, by a spring 73. When a rod 31 is released from the feeding device it will roll down on the plates against the stops 40. The bracket also carries a plurality of rubber or resilient pads 74, the forward ends 75 of which are preferably bevelled as shown. These pads are located in the path of movement of the printing head, and the rods are partly supported on said pads while they are being printed. The vertical legs 76 of the bracket are each formed with a slot 77 (see Fig. 5) and are adjustably secured to the base 12 by screw-bolts 78. Vertical adjustment-screws 79 are threaded through the eyes 80 of the bracket. By loosening the bolts 78 and turning the screws 79, the bracket may be adjusted in height as required for printing the rods.

On the forward stroke of the printing-head 11 the print type of the printing-plate contacts the rod 31 and applies the desired marking on the surface thereof. During the printing operation, the hinged plates 72 are depressed to substantially horizontal position, as seen in Fig. 6, and the rod is rolled on the plates and supporting pads 74. The momentum imparted to the rod causes it to roll off the supports, after it has been printed, onto the delivery chute 81 and into the box or bin 82.

It will be apparent from the foregoing description that the operation of printing and marking the rods is wholly automatic, and that at each cycle of operation one rod will be printed, another rod will be released by the fingers 39 into position to be printed on the succeeding cycle, and a third rod will be held in reserve by the fingers 38. The timing of the several moving parts are synchronized to achieve that result.

While certain embodiments of the invention have been shown and described, it will be understood that the invention is not limited thereto and that other embodiments may be made without departing from the spirit and scope of the invention as set forth in the claims.

We claim:

1. In a machine of the character described, the combination of a frame, a printing head mounted for back and forth reciprocating motion on the frame, means for so reciprocating the head, a supply receptacle for holding a plurality of cylindrical rods to be printed, said receptacle including a pair of parallel inclined side members on which the ends of the rods are supported to roll downwardly by gravity, two detents, one spaced upward of the other, disposed in the path of the rods for arresting rolling movement thereof, means for successively operating the detents first to open the upper detent to release one rod from the supply into engagement with the lower detent and then to open the latter, and means to close said upper detent as said lower detent is opened to release a rod into position for surface contact with the printing head on the forward stroke of the latter.

2. In a machine of the character described, the combination of a frame, a printing head mounted for back and forth reciprocating motion on the frame, means for so reciprocating the head, a supply receptacle for holding a plurality of cylindrical rods to be printed, said receptacle including a pair of parallel inclined side members on which the ends of the rods are supported to roll downwardly by gravity, two detents, one spaced upward from the other, disposed in the path of the rods for arresting rolling movement thereof, means for successively operating the detents first to open the upper detent to release one rod from the supply into engagement with the lower detent and then to open the latter, means to close said upper detent as said lower detent is opened to release a rod into position for surface contact with the printing head on the forward stroke of the latter, and guide members supported above supply receptacle to prevent the rods from mounting one on another as they roll down on the inclined members.

3. In a machine of the character described, the combination of a frame, a printing head mounted for reciprocating motion on the frame, means for reciprocating the head, a supply receptacle for holding a plurality of cylindrical rods to be printed, said receptacle including a pair of parallel inclined side members on which the ends of the rods are supported to roll downwardly by gravity, two sets of fingers, one spaced upward of the other, disposed in the path of the rods for arresting rolling movement thereof, a cam for successively raising the fingers out of the path of the rods first to open the upper set to release one rod from the supply into engagement with the second set and then to open the latter to release a rod into position to be printed by the printing head, means to close said upper set of fingers as said lower set of fingers is opened, and power transmission means including a clutch for controlling operation of the cam in timed relation to the reciprocating movement of the printing head.

4. In a machine of the character described, the combination of a frame, a reciprocating printing head slidably mounted thereon, means for feeding a plurality of cylindrical welding rods one at a time into position to be printed by the printing head, inclined side members down which the rods roll into printing position, spring pressed hinged plates disposed adjacent the lower end of the inclined side members upon which plates the rods are received in printing position, said plates normally extending at substantially the same inclination as the inclined members but being adapted to be depressed by the rods as the printing head passes over the rods in rolling contact with said rods, and power transmission means for reciprocating the printing head and operating the feeding means.

THEODORE I. LESTON.
WILLIAM B. KRIEWALL.

REFERENCES CITED

The following references are of record in the file of this patent:

UNITED STATES PATENTS

| Number | Name | Date |
| --- | --- | --- |
| Re. 7,059 | Hall | Apr. 18, 1876 |
| 985,479 | Waller | Feb. 28, 1911 |
| 1,106,712 | James | Aug. 11, 1914 |
| 1,314,043 | Brewer | Aug. 26, 1919 |
| 1,657,382 | Felten | Jan. 24, 1928 |